United States Patent [19]

Fouche

[11] Patent Number: 4,976,177
[45] Date of Patent: *Dec. 11, 1990

[54] WORKPIECE-CARRIER SPINDLE ASSEMBLY HAVING MAGNETIC BEARINGS, AND A DEVICE IMPLEMENTING SUCH AN ASSEMBLY FOR A VERY HIGH PRECISION MACHINE TOOL

[75] Inventor: Claude Fouche, Gasny, France

[73] Assignee: S.A.: Societe Europeenne de Propulsion, Suresnes, France

[*] Notice: The portion of the term of this patent subsequent to May 29, 2007 has been disclaimed.

[21] Appl. No.: 221,252

[22] PCT Filed: Nov. 13, 1987

[86] PCT No.: PCT/FR87/00448
§ 371 Date: Aug. 31, 1988
§ 102(e) Date: Aug. 31, 1988

[87] PCT Pub. No.: WO88/03458
PCT Pub. Date: May 19, 1988

[30] Foreign Application Priority Data

Nov. 13, 1986 [FR] France .................. 86 15762

[51] Int. Cl.⁵ .................. B23B 19/02; F16C 32/04
[52] U.S. Cl. .................. 82/147; 310/90.5
[58] Field of Search .................. 310/90.5; 82/1.11, 12, 82/147, 151, 903

[56] References Cited

U.S. PATENT DOCUMENTS 4,114,960  9/1978  Habermann .................. 308/12
4,180,946  1/1980  Heijkenskjoid .................. 51/134.5

FOREIGN PATENT DOCUMENTS 2656469  6/1978  Fed. Rep. of Germany ..... 310/90.5
65416    4/1982  Japan .................. 310/90.5
97916    6/1982  Japan .................. 310/90.5
37322    2/1984  Japan .................. 310/90.5
193704   8/1987  Japan .................. 82/147
8505417 12/1985  World Int. Prop. O. ......... 310/90.5

Primary Examiner—Frederick R. Schmidt
Assistant Examiner—Blynn Shideler
Attorney, Agent, or Firm—Poms, Smith, Lande & Rose

[57] ABSTRACT

The workpiece-carrier spindle assembly comprises a stator (10) mounted on a slide (202), a spindle (50) supported by active magnetic bearings and rotated by an external electric motor (2) connected to the stator via a coupling (3) which filters the mechanical disturbances due to the excentricity of the motor, and a chuck (5) fixed to the spindle (50). Additional means for detecting movements of the spindle assembly slide (202) include, in the servo-control plane of each of the radial beraings, two position detectors (216, 218; 215, 217) fixed to the stator (10) and facing two plane reference surfaces (211, 212) disposed parallel to the direction of slide displacement and delivering signals which are applied to means for selectively modifying the electric reference voltages applied to the servo-control loops of the magnetic bearings. The spindle assembly is applicable to machine tools for providing optical-quality machining.

14 Claims, 10 Drawing Sheets

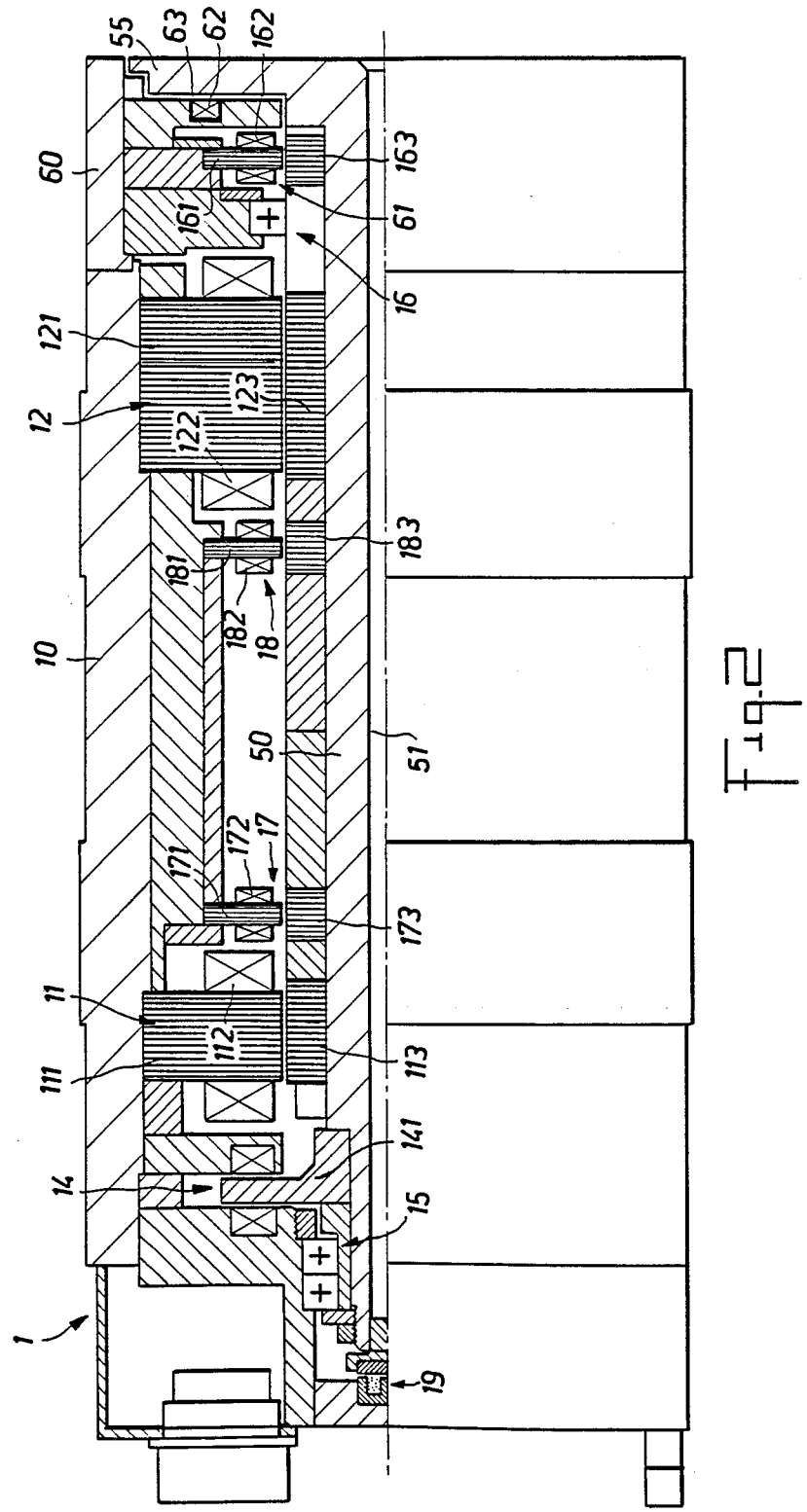

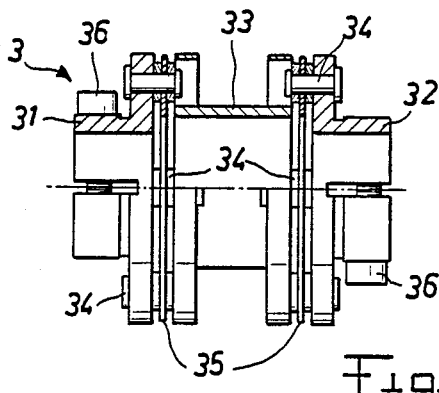
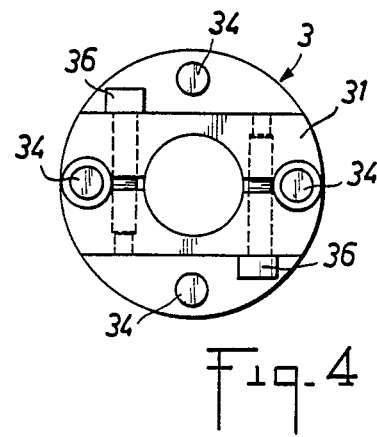
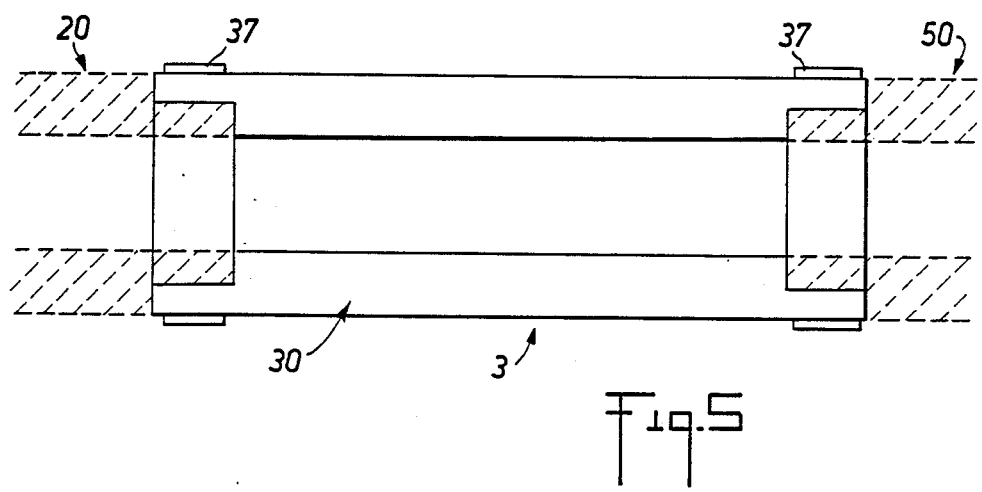
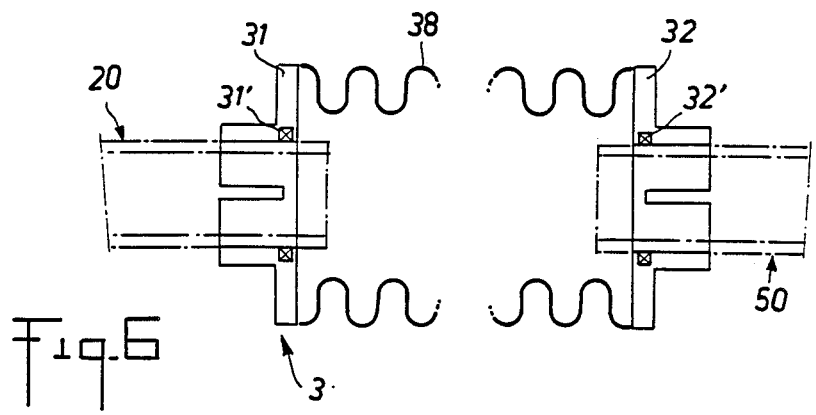

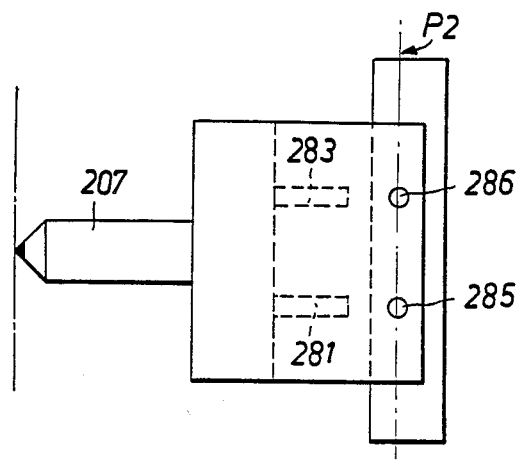
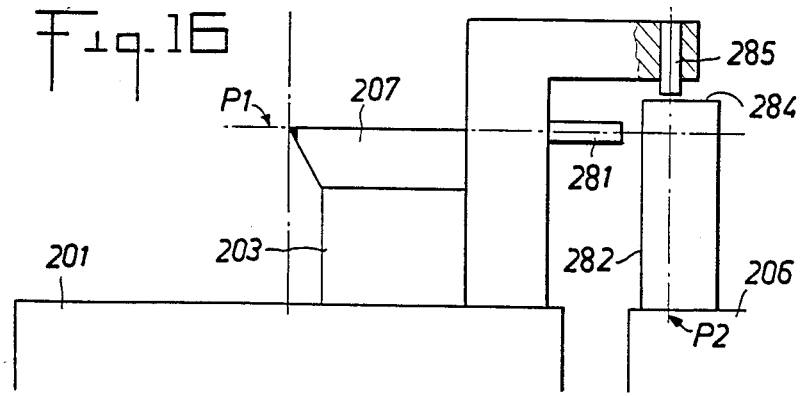
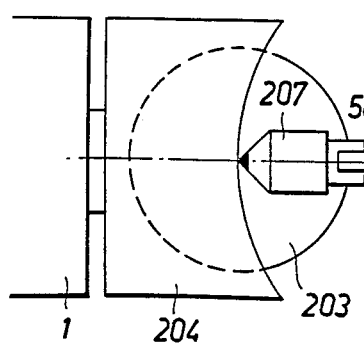

WORKPIECE-CARRIER SPINDLE ASSEMBLY HAVING MAGNETIC BEARINGS, AND A DEVICE IMPLEMENTING SUCH AN ASSEMBLY FOR A VERY HIGH PRECISION MACHINE TOOL

The present invention provides a workpiece-carrier spindle assembly having active magnetic bearings for a very high precision machine tool, the assembly comprising a stator mounted on a slide for guidance along a predetermined direction, a spindle mounted inside the stator, a chuck fixed to the spindle, first and second radial active bearings supporting the spindle and controlled from radial detectors for detecting the position of the rotor, an axial abutment constituted by an axial active magnetic bearing co-operating with a disk fixed to the spindle and controlled from at least one axial detector for detecting the position of the spindle, and an electric motor for rotating the spindle.

The invention also relates to a device implementing such a spindle assembly for a very high precision machine tool in order to facilitate precise machining of complex surfaces using cartesian co-ordinates or polar co-ordinates.

High precision machine tools use a workpiece-carrier spindle assembly mounted on a slide which is generally controlled by a screw-and-nut system associated with a D.C. electric motor whose rotor is directly coupled to the slide drive screw. The spindle on which the workpiece is fixed is itself mounted in the spindle assembly by means of air bearings which give the spindle a high degree of stiffness.

The use of air bearings requires very small gaps between the spindle and its stator, said gaps being about 5 μm across. However, this does not eliminate precision-limiting residual disturbance movements in the spindle, particularly since slide defects can never be totally eliminated.

Proposals have already been made to rectify workpieces mounted on active magnetic bearings in order to obtain a high degree of precision and stability in the control of workpiece rotation. However, this implies that removable magnetic bearings are available, which is applicable to making workpieces of certain shapes only.

U.S. Pat. No. 4,180,946 corresponding to French patent No. 75 30209 describes a tool-carrier spindle assembly, in particular for a rectifier, in which the spindle is mounted in active radial bearings and which includes an electric drive motor incorporated in the stator of the spindle assembly and situated between the two end radial bearings. Although such a tool-carrier spindle assembly provides a degree of flexibility in use for performing a certain number of machining operations, it is not suitable for being incorporated in the architecture of a very high precision machine tool. In addition, having an electric motor integrated in the stator of the spindle assembly and disposed between the two radial bearings increases the amount of heat given off and the amount of vibration in the magnetic suspension, and generates electrical and magnetic interference at the various detectors which are used for servo-controlling the magnetic bearings, such that control of tool movement remains limited in precision.

The present invention seeks to remedy the above drawbacks and to make it possible to perform very high precision machining work for the purpose of making surfaces which are typical or atypical and having the general shape of a surface of revolution, by eliminating or correcting the defects of the various mechanical assemblies working relative to one another in order to make complex surfaces in a system of axes which are cartesian or polar.

These objects are achieved by means of a workpiece-carrier spindle assembly of the type specified at the beginning of the description, and characterized in that the electric motor is external to the spindle assembly stator, is disposed behind the spindle and substantially in alignment therewith, in that the external motor has a smaller air gap than the air gap between the radial magnetic bearings and the spindle, in that the rotary drive communicated to the spindle by the external motor expressed in revolutions per second (Hz) lies outside the servo-control passband of the magnetic suspension system expressed in hertz, in that a flexible coupling device connects the outlet shaft of the external motor to the rear portion of the spindle while filtering mechanical disturbances due to the eccentricity of the motor, and in that the spindle assembly further includes additional means for detecting movements of the spindle assembly guide slide and means for selectively modifying the electrical reference voltages of the servo-control loops of the axial bearing and of the radial bearings as a function of the signals from said additional detection means, said additional means for detecting movements of the slide on which the workpiece-carrier spindle assembly is placed including two detectors in the servo-control plane of each of the radial bearings, said detectors being fixed to the spindle assembly stator and facing two plane reference surfaces disposed parallel to the displacement direction of said slide, said detectors delivering electrical signals proportional to variations in the distances between said detectors and said plane reference surfaces in order to control in real time the means for selectively modifying the reference voltages of the servo-control loops of the radial bearings of the workpiece-carrier spindle assembly as a function of said proximity variations between the detectors and the plane reference surfaces.

By combining a spindle support device having active magnetic bearings with spindle drive means lying outside the spindle stator and with additional detection means, it becomes possible to position the workpiece to be machined with improved precision and stability while permanently compensating for defects in external adjustment elements such as slides, and facilitating the making of special typical surfaces such as domed surfaces or fluting.

The chuck fixed to the spindle may either be a suction plate provided with suction orifices distributed over its front face, or else a magnetic plate, or else a so-called "American" clamp, or else a mechanical chuck.

However, in a preferred embodiment, the chuck fixed to the spindle is constituted by a suction plate provided with suction orifices, and the suction device includes a vacuum pump, a suction buffer chamber situated behind the electric motor and connected to the vacuum pump, and a suction duct running from inside the buffer chamber and extending axially along the inside of the motor shaft, through the coupling device and the spindle and opening out into a cavity formed in the workpiece-carrier chuck and in communication with the suction orifices.

This organization of the suction device is easy to provide and is effective in preventing pumping disturbances from being communicated to the spindle.

Advantageously, the coupling device comprises an airtight tubular sleeve made of a material such as rubber or elastomer.

By way of example, the external motor may have an air gap of about 0.1 mm, whereas the air gap between the radial magnetic bearings and the spindle may be about 0.3 mm.

Preferably, the natural frequency of the magnetic suspension system is about 50 Hz to 60 Hz, whereas the speed of rotation of the spindle lies between about 25 revolutions per second (Hz) and 40 Hz.

According to a special characteristic of the invention, which contributes to increasing precision, the spindle assembly includes first and second axially spaced-apart radial detectors situated on either side of said second radial magnetic bearing disposed in the vicinity of the workpiece-carrier chuck, the second radial detector is removably mounted between said second radial magnetic bearing and the workpiece-carrier chuck, and during an initial setting up stage, the second radial magnetic bearing is controlled by the first radial detector in order to perform an operation on the spindle of rectifying the reference track of the second radial detector, and during subsequent stages of machining workpieces supported by the workpiece-carrier chuck, the second radial magnetic bearing is controlled by the second radial detector co-operating with said reference track.

Similarly, the spindle assembly may successively implement first and second axial detectors, with the first axial detector being disposed at the rear of the spindle assembly and serving to control an axial abutment during an operation of rectifying a reference track on a front face formed at the front of the spindle assembly, with the second axial detector which cooperates with said reference track serving to control the axial abutment during a subsequent stage of machining a workpiece.

The invention also provides a device for correcting defects in the movements of the slides in a machine tool used in a cartesian frame of reference and including first and second slides whose displacement axes are oriented along two perpendicular directions XX' and YY', a turntable placed on the first slide, a workpiece-carrier spindle assembly placed on the second slide, and devices for measuring the displacements of the first and second slides, said device for correcting defects in the movements of the slides being characterized in that it comprises a workpiece-carrier spindle assembly of the above-mentioned type, additional means for detecting the movements of the first slide for guiding the turntable, said additional means for detecting the movements of the first slide on which the turntable is placed comprising a moving detector placed in a vertical plane containing the axis of the tool and fixed to the first slide, a plane reference surface placed perpendicularly to the axis of the workpiece-carrier spindle assembly, and means for detecting variations in the space between the detector and the plane reference surface, with the means for selectively modifying in real time the electrical reference voltage of the servo-control loop of the axial bearing being controlled as a function of said proximity variations between said moving detector fixed to the first slide and said plane reference surface.

The invention also provides a device for correcting eccentricity defects in the turntable of a machine tool used with polar co-ordinates, the machine tool including a first adjustment slide, extending over a vertical axis turntable on which a second adjustment slide is placed for supporting a tool, and a workpiece-carrier spindle assembly placed on said first adjustment slide, said device being characterized in that it comprises a workpiece-carrier spindle assembly of the above-specified type, and in that it further comprises a spherical reference surface centered on the axis of the turntable and placed on a fixed support fixed to the base carrying the machine tool, a proximity sensor placed on the axis of the tool, means for detecting proximity variations between the sensor and the spherical reference surface, and means for modifying in real time the reference voltage of the servo-control loop of the axial bearing of the workpiece-carrier spindle assembly as a function of said proximity variations between the sensor and the spherical reference surface.

The various measures provided by the present invention contribute to obtaining performance lying in the domain of optical precision.

Thus, by way of example, workpieces machined in accordance with the invention and using a workpiece-carrier spindle mounted on servo-controlled magnetic bearings have made it possible to obtain cylindrical workpieces in which departures from true are less than one tenth of a micrometer. In particular, a machined piece of AG5 aluminum alloy having a diameter of 220 mm has a peak-to-peak error of 0.1 micrometers, and a machined piece of germanium having a diameter of 55 mm has a peak-to-peak error of 0.089 micrometers.

Plane pieces also have very small departures from planeness. Thus, pieces having a diameter of 105 mm and made of germanium or of AG5 aluminum alloy have form errors relative to a plane of $\lambda/8$ and $\lambda/2.3$ respectively (where $\lambda = 0.6328$ $\mu$m).

Figure 8:
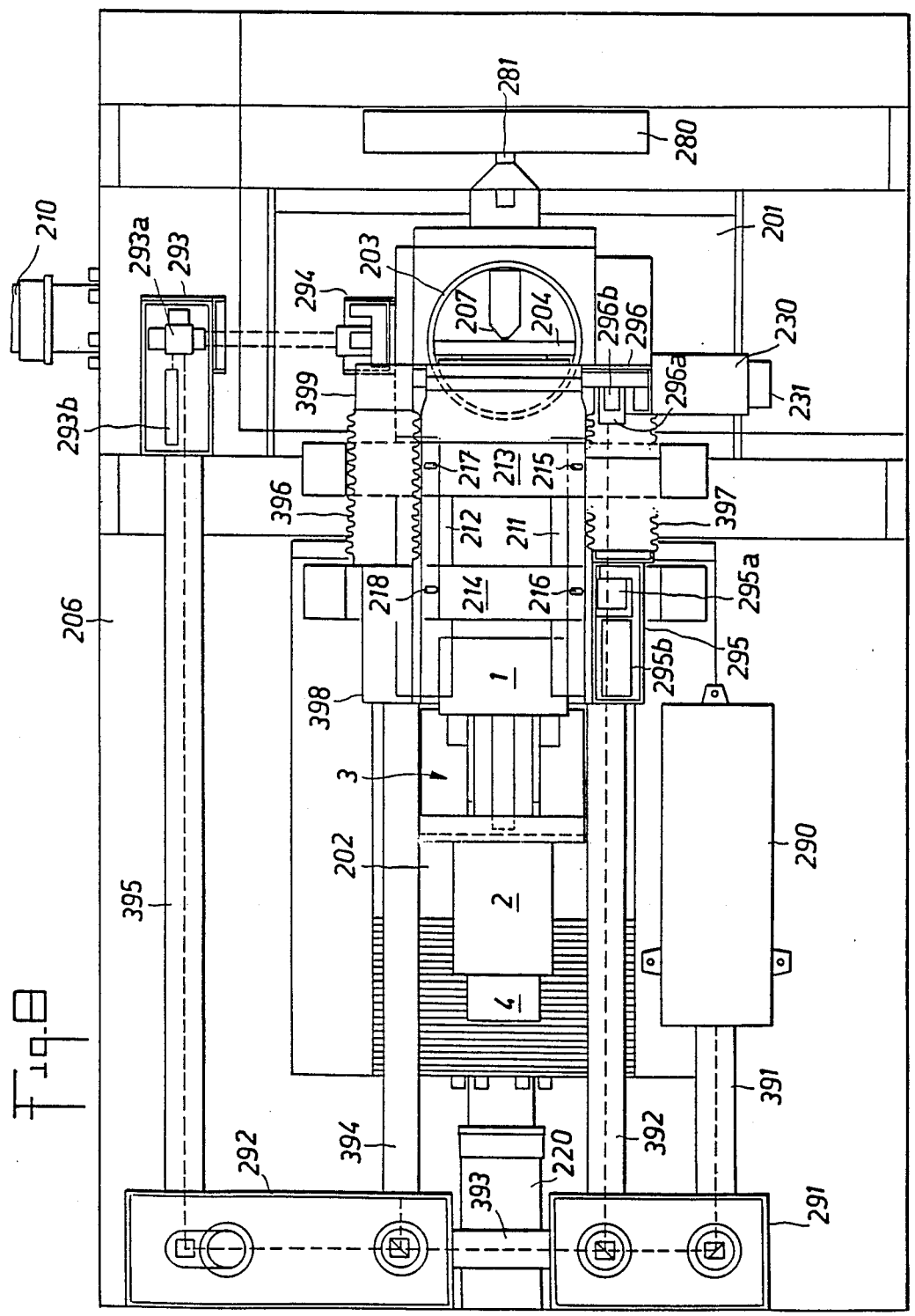
FIGS. 8 and 9 are respectively a plan view and an elevation view of an example of a very high precision machine tool using the FIG. 1 spindle assembly in a cartesian axis system.
Figure 9:
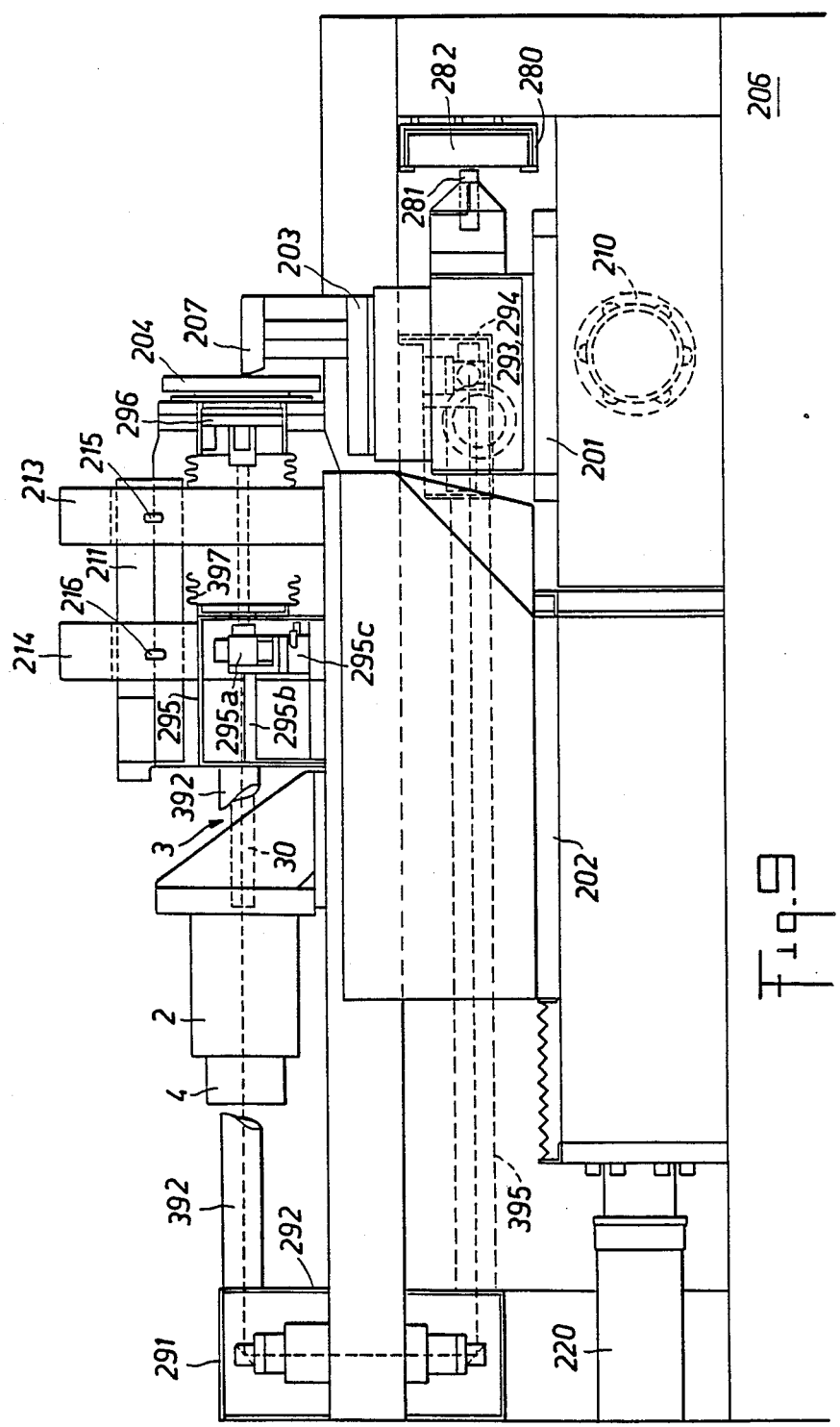

Other characteristics and advantages of the invention appear from the following description of specific embodiments of the invention made with reference to the accompanying drawings, in which:

FIG. 2 is a detailed view showing the magnetic means in the FIG. 1 assembly for supporting the spindle;

FIGS. 3 and 4 are respectively an elevation and a back view of a first example of a coupling device usable in the FIG. 1 spindle assembly;

FIGS. 5 and 6 are elevation views of second and third examples of coupling devices usable in the FIG. 1 spindle assembly;

FIGS. 15 and 16 are diagrammatic views respectively from above and in the plane XVI—XVI of FIG. 15 showing a variant of a portion of the machine tool shown in FIGS. 8 and 9;

Figure 17:
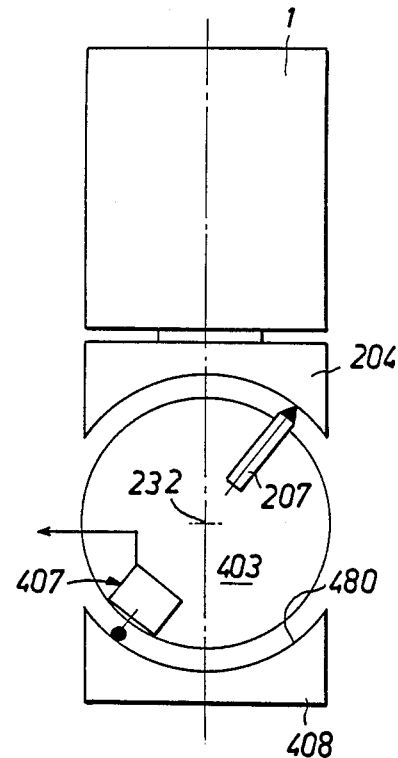

FIG. 17 is a diagrammatic plan view of a portion of a polar co-ordinate machine tool showing the presence of a spherical reference surface; and FIG. 18 is a diagrammatic plan view of a portion of a cartesian co-ordinate machine tool and showing the presence of a spherical reference surface.

Figure 1:
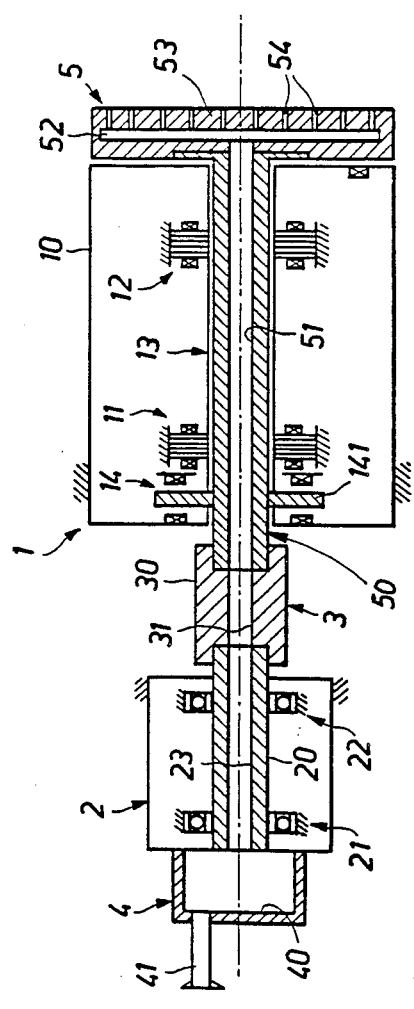
FIG. 1 is a diagrammatic axial section through a workpiece-carrier spindle assembly according to the present invention.

FIG. 1 is a diagram showing the overall structure of a workpiece-carrier spindle assembly 1 intended to be mounted on the slide of a high precision machine tool.

Figure 11:
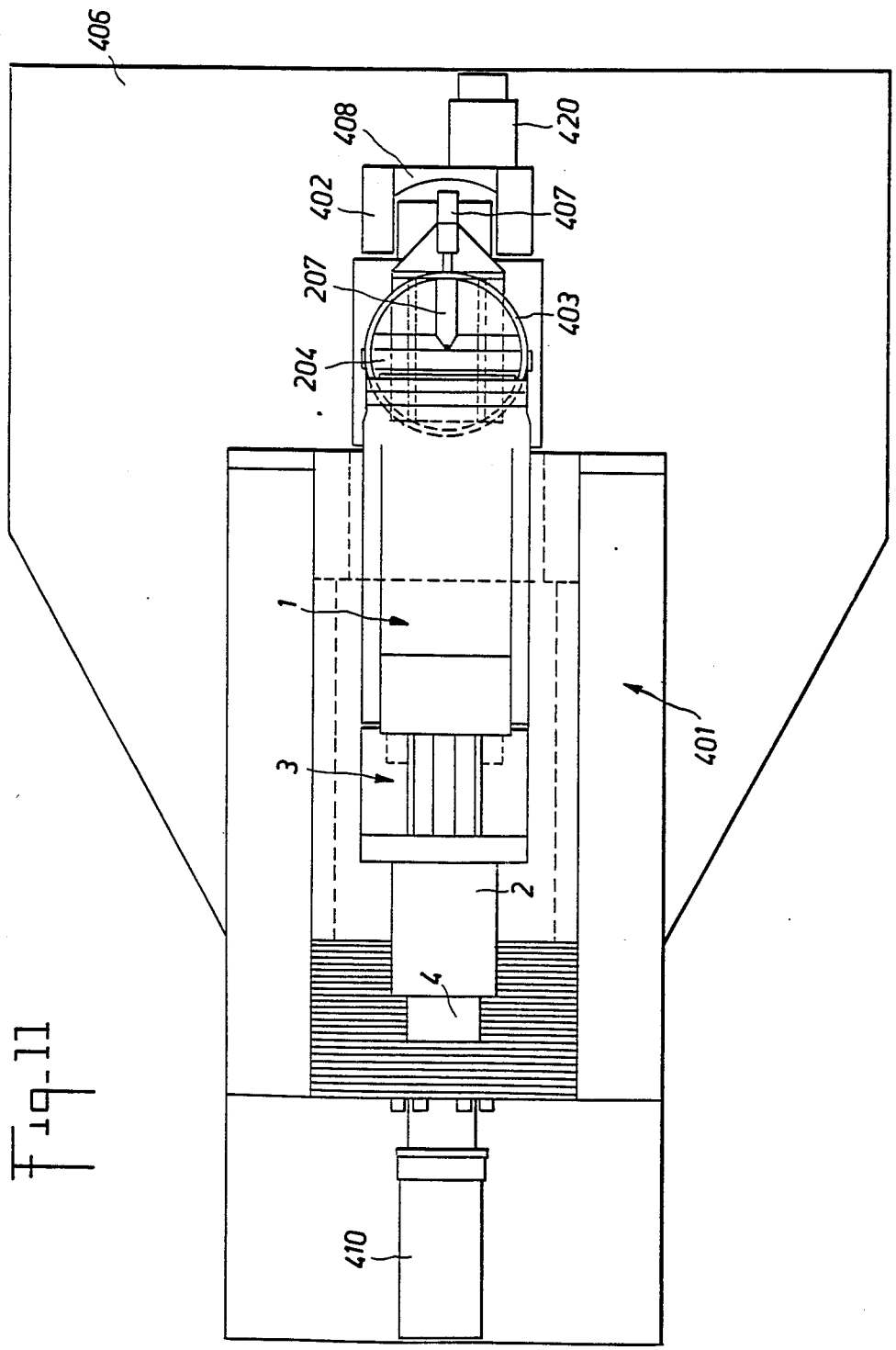
FIGS. 11 and 12 are respectively a plan view and an elevation of a very high precision machine tool using the FIG. 1 spindle assembly in a polar co-ordinate axis system.
Figure 12:
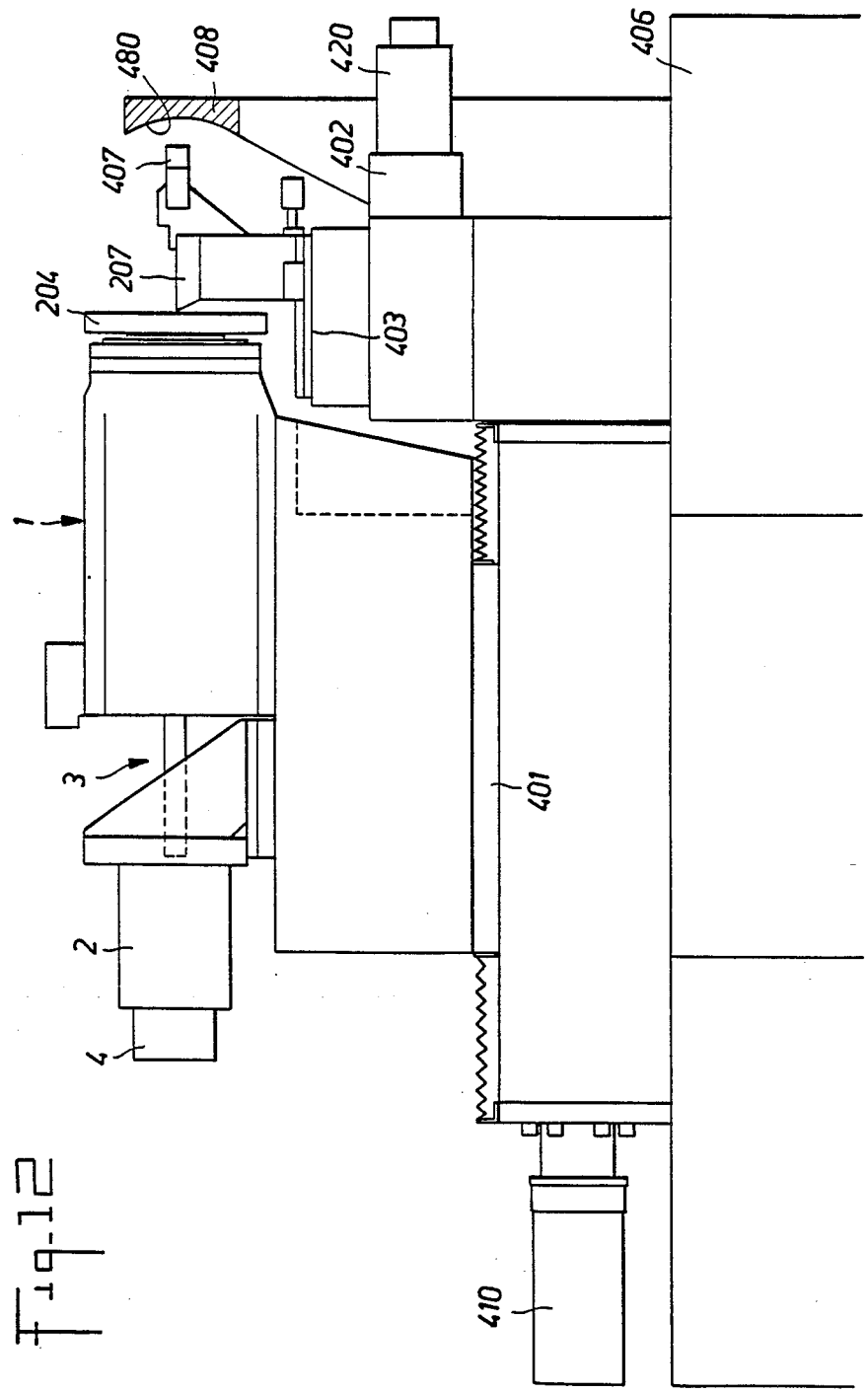

The assembly 1 comprises a stator 10 which is fixed to an adjusting slide such as the slide referenced 202 in FIGS. 8 and 9 or the slide referenced 401 in FIGS. 11 and 12. The stator 10 houses the stator components of a front radial magnetic bearing 12 and of a rear radial magnetic bearing 13 which define a relatively large gap 13 relative to the spindle 50 of the assembly 1, said gap having a width of about 0.3 mm. The stator 10 also includes the stator components of an axial magnetic bearing which co-operates with a disk 141 fixed at the rear end of the spindle 50 and extending perpendicularly to the axis thereof for the purpose of constituting an axial abutment.

The spindle 50 terminates at its front end with a workpiece-carrier chuck 5 lying on the axis of the assembly 1 and having a diameter greater than that of the spindle 50. Preferably, and as shown in FIG. 1 where the chuck 5 is a suction plate, the workpiece-carrier chuck 5 has a cavity 52 which is in communication with a duct 51 extending axially inside the spindle 50. Orifices 54 are distributed over the front face 53 of the workpiece-carrier disk 5 and open out into the cavity 52 to enable a workpiece for machining to be maintained in contact with the front face 53 of the workpiece-carrier disk 5 by suction.

The spindle 50 is rotated by an electric motor 2 which is external to the stator 10 and which comprises a rotor 20 that may be mounted on precision ball bearings 21 and 22, on conical roller bearings, or on magnetic bearings. The external motor 2 is designed so as to ensure that its excentricity does not exceed a few micrometers.

The spindle 50 and the rotor 20 of the external motor 2 are interconnected by a coupling 3 for transmitting rotary drive from the motor while filtering mechanical disturbances due to motor excentricity.

The coupling device 3 is advantageously constituted by a pipe 30 made of elastomer or of some other material having similar resilient properties and it is fixed in airtight manner by clamping means 37 to the free end of the rotor 20 of the motor 2 and to the free end of the spindle 50 of the assembly 1 (see FIG. 5). This method of coupling provides an airtight seal across the link between the motor 2 and the spindle 50 without requiring additional sealing rings, while simultaneously providing the above-mentioned mechanical functions in a manner which is entirely satisfactory.

Nevertheless, in a variant, the coupling device could be constituted by a metal bellows 38 clamped to fixing flanges 31 and 32 at the free ends of the rotor of the motor 2 and of the spindle 50 (see FIG. 6). The airtight sealing required for use with a suction plate is provided by O-rings 31' and 32'.

Another embodiment of the coupling device 3 and shown in FIGS. 3 and 4 comprises flexible blades 35 which are clamped by fasteners 34 between the connection flanges 31 and 32 at the free ends of the rotor of the motor 2 and of the spindle 50, together with a central sleeve 33. Fastenings 36 hold the flanges 31 and 32 to the end of the rotor 20 and the end of the spindle 50.

In these various embodiments of coupling devices, a duct 31 is axially defined inside the coupling to provide continuity between the duct 51 in the spindle 50 and a duct 23 formed axially along the rotor 20 of the motor 2. The duct 31 is made in such a manner as to ensure airtight continuity between the ducts 23, 31, and 51.

A suction box 4 delimits a distribution chamber 40 which is applied to the rear of the motor 2 and which is rigidly fixed to the stator thereof. The chamber 40 communicates firstly with a vacuum pump (not shown) via a vacuum line 41, and secondly with the ducts 23 running along the rotor 20 of the motor 2. With this disposition, the greatest amount of leakage between the outside and the suction circuit constituted by the chamber 40, the ducts 23, 31, and 51, and the chamber 52, takes place at the gap between the rotor 20 of the motor 2 and the stator of said motor. Given the small size of this gap (about 0.1 mm), head losses due to such leaks are relatively low. There is therefore no need to provide a chicane baffle or other rotary seal which is always difficult to implement and which invariably gives rise to axial vibration.

The suction system in accordance with the invention for pumping air from the chamber 52 in the workpiece-carrier plate 5 to the vacuum pump via the spindle 50, the coupling 3 including an elastomer pipe or a metal bellows, the rotor 20 of the motor 2, and the suction box 4 ensures that the mechanical disturbances which inevitably arise due to pumping, in particular axial disturbances, are completely absorbed by the motor 2 and are not transmitted to the spindle 50, given the presence of the coupling 3.

The absence of any electric motor incorporated between the radial bearings of the spindle assembly, and the absence of any pumping performed immediately behind the spindle 50 make it possible to use a spindle 50 which is short and compact, thereby increasing spindle stability and stiffness.

The magnetic suspension of the spindle 50 inside the spindle assembly stator 10 is now described in greater detail with reference to FIG. 2.

The magnetic suspension shown in FIG. 2 comprises first and second radial active magnetic bearings 11 and 12 disposed respectively towards the back end and towards the front end of the spindle assembly stator 10. Each of the radial magnetic bearings 11 and 12 comprises, in conventional manner, a stator comprising a stack of laminations 111 or 121, together with windings 112 or 122, and a magnetic circuit 113 or 123 which is fixed to the spindle 50. Both of the radial bearings 11 and 12 are called "active" bearings since each of them is associated with a servo-control loop and with at least one detector 17 or 18, 61 disposed in the vicinity of the corresponding radial bearing and serving to detect the position of the spindle 50. As is conventional for active magnetic bearings, the radial detectors 17, 18, and 61 may be of the inductive type having respective stator magnetic circuits 171, 181, and 161 and windings 172, 182, or 162 disposed facing a corresponding annular reference track 173, 183, or 163 formed on the spindle 50. Advantageously, the detectors 17, 18, and 61 are constituted by harmonic-rejection radial detectors as described in French patent No. 2 214 890.

Given that the workpiece-carrier spindle assembly 1 in accordance with the invention is intended for use in very high precision machines, it is necessary to rectify the spindle 50 so as to improve its geometrical tolerances (concentricity of the bearings and of the detectors), and also to increase the circularity of the tracks in the detectors and in the bearings.

This may be done, for example, by initially rotating the spindle when unloaded. The signals coming from the detectors are then exactly representative of the excentricity defects of the detectors. These defects are recorded in a memory, and in normal operation, these defects are applied to the servo-control loops in order to correct for the defects of the detector tracks.

As mentioned above, it is important for the reference tracks of the radial detectors to present excellent circularity.

If it is desirable to avoid using an electronic device constituted by appropriate circuit cards for generating various correction harmonics on a permanent basis, such a device may be used solely for rotating the spindles with high precision by means of temporary radial and axial sensors 17, 18, and 19, for the purpose of machining the tracks of at least one new radial detector 61 and at least one new axial detector 62 to within the precision of rotation of the spindle 50. When machining is terminated, the new detectors 61 and 62 are connected to the appropriate servo-control loops, and the electronic circuit for generating correction harmonics may be omitted.

FIG. 2 shows an axial detector 19 and two radial detectors 17 and 18 which can be used for controlling the axial abutment 14 and the radial bearings 11 and 12 during the machining of the reference track 163 of a new radial detector 61 placed in the vicinity of the front end of the spindle 50, and of the reference track 63 of a new axial detector 62, also formed on the front face of the spindle 50. After the detectors 61 and 62 have been added to the front portion 60 of the spindle assembly stator 10, the front radial bearing 12 and the axial abutment 14 may be controlled by the detectors 61 and 62. The rear axial detector 19 can then be removed in order to open up the duct 51 along the spindle 50, if a suction chuck is being used.

The quality of the detectors can also be improved, even when no electronic harmonic correction circuit is available. Under such circumstances, the tracks 163 and 63 of the new radial and axial detectors 61 and 62 are machined during a testing stage for the purpose of being used in subsequent normal operation in the feedback loops for the radial bearing 12 and the axial bearing 14 instead of the original detectors 18 and 19.

In FIG. 2, references 15 and 16 designate emergency bearings constituted by ball bearings which are not used in normal operation.

In general, in accordance with the present invention, the natural frequencies of the servo-control should lie between about 50 Hz and 80 Hz, and preferably between 50 Hz and 60 Hz, and the workpiece-carrier spindle is rotated at a speed lower than said natural frequencies, and preferably at a speed lying between about 25 Hz and 40 Hz. The servo-control loops have a gain maximum for the first harmonic.

In order to retain machining precision to the full, machining passes are preferably performed very finely.

A suction type chuck is described above with reference to FIGS. 1 and 2. It is also possible, in some applications, to use a magnetic chuck. In which case, in order to avoid disturbing the operation of the detectors disposed in the vicinity of the magnetic chuck, the axial detector 62 is of the capacitive type rather than being of the inductive type as shown in FIG. 2.

Further, since the electric motor is not disposed between the radial bearings 11 and 12, all of the disturbances which could be caused by having such an electric motor in the immediate vicinity of the bearings, namely heat losses, vibration, and electrical and magnetic interference with the detectors, are avoided. It may nevertheless be desirable to mount a device for regulating the temperature of the spindle assembly stator, e.g. by circulating fluid through the stator. Although the heat losses from the magnetic bearings are small in comparison to the heat losses from an electric motor, they are not always negligible.

Various examples of applying the workpiece-carrier spindle assembly 1 in accordance with the invention to very high precision machine tools are now described with reference to FIGS. 7 to 18.

Figure 7:
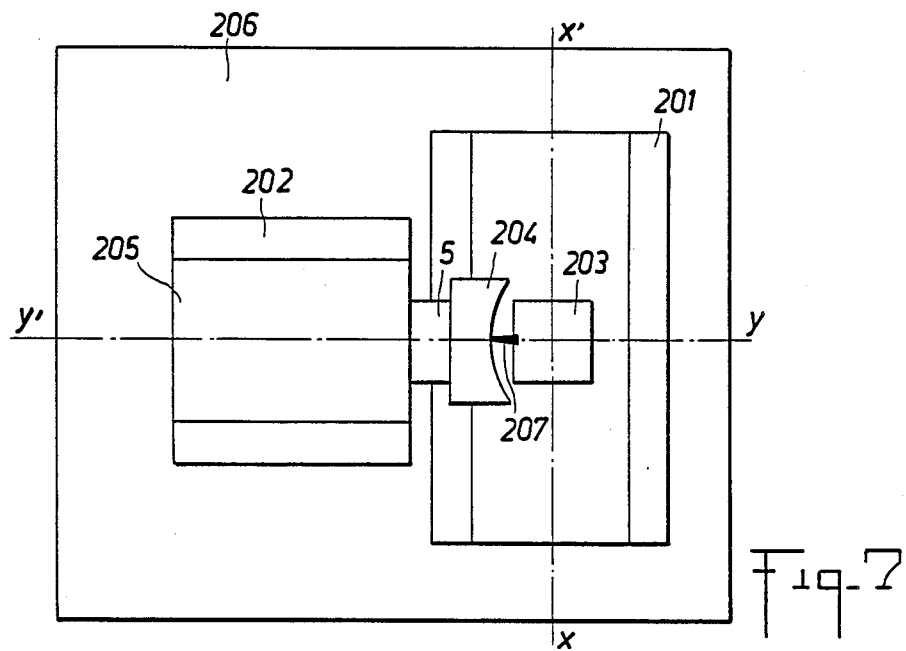
FIG. 7 is a diagrammatic plan view of a machine tool using a system of orthogonal co-ordinate axes.

A first example concerns a machine for machining complex surfaces in a cartesian frame of reference XX', YY' and is shown symbolically in FIG. 7.

Two slides 201 and 202 having perpendicular displacement axes XX' and YY' are disposed on a support 206 such as a block of granite which is fixed to the ground by means of a pneumatic suspension.

The slide 201 carries a turntable 203 on which a tool 207 is placed, whereas the slide 202 carries a workpiece-carrier spindle assembly 205 which may correspond to the above description of the spindle assembly 1. The workpiece to be machined 204 is placed on the workpiece-carrier disk 5 at the end of the spindle assembly 205.

The turntable 203 serves to point the tool in such a manner that it is always the same portion of the tool's cutting edge which performs the machining, thereby ensuring that geometrical irregularities of the cutting edge has no effect.

FIGS. 8 and 9 show one embodiment of a machine of the type symbolized in FIG. 7.

These figures show D.C. electric motors 210 and 220 each driving a screw and nut system for displacing a respective one of the slides 201 and 202. The slides 201 and 202 are displaced under digital control and their displacement is measured by a conventional Doppler interferometer device.

The interferometer device is essentially constituted by a laser source 290, housings 291 and 292 containing retroreflection cubes, a plane mirror housing 294 and an interferometer housing 293 for measuring displacement of the tool slide 201, two plane mirror housings 296 and 399 and two interferometer housings 295 and 398 for measuring displacement of the spindle slide 202, bellows 397 & 396 providing connections between the interferometer housings 295 & 398 and the plane mirror housings 296 & 399, and tubes 391 to 395 for protecting the measurement laser beams. Each of the plane mirror housings 294, 296, or 399, such as the housing 296, contains a plane mirror 296a and adjusting stops 296b. Each of the interferometer housings 293, 295, or 398 includes a measuring interferometer 293a, 295a, a receiver 293b, 295b, and an adjustment device such as 295c.

In order to ensure that the machined surfaces are correct, it is necessary for the spindle to rotate without eccentricity and also for the displacement of the spindle to be performed with precision, and it is therefore necessary to detect movements of the spindle-carrier slide 202 and to perform corrections by displacing the spindle 50 radially. This type of correction may be as much as +150 μm, which is considerable. In order for the defects generated by displacement of the tool-carrier slide 201 to have no effect on the workpiece to be machined, it is also necessary to be able to detect movement of the slide 201 at the tool in order to intervene axially on the spindle 50. This correction may be as much as +150 μm.

The workpiece-carrier spindle assembly 1 also serves to compensate for defects in the mechanical elements of the machine tool. By acting on the servo-control loops of the magnetic bearings in the workpiece-carrier spindle assembly 1, it is possible to keep the axis of the spindle accurately positioned in spite of roll, pitch, or yaw defects in the displacements of either of the slides 201 and 202.

Figure 13:
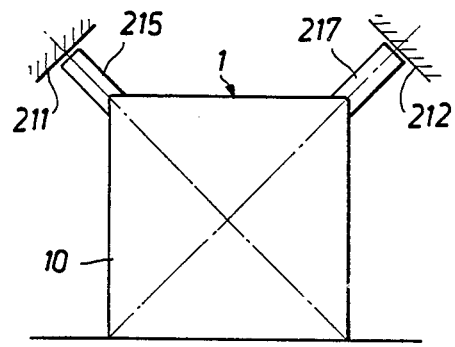
FIG. 13 is a diagrammatic view in the servo-control plane of the front radial bearing supporting the spindle of the FIG. 1 assembly.

This compensation can be performed in real time providing each of the servo-control planes of the radial magnetic bearings 11 and 12 is provided with two detectors, e.g. capacitive type detectors 216 & 218 or 215 & 217 which are mounted on brackets 214, 213 fixed to the spindle assembly stator 10 and which serve to detect changes in distance relative to fixed plane reference surfaces 211 and 212 placed parallel to the displacement direction YY' of the spindle carrier slide 212 and perpendicularly to the servo-control axes shown in dot-dashed lines in FIG. 13. As can be seen in this figure, the surfaces 211 and 212 are at an angle close to 45° relative to the support plane of the spindle assembly 1.

The plane reference surface 211 is common to the detectors 215 and 216, while the plane reference surface 212 is common to the detectors 217 and 218. The plane reference surfaces 211 and 212 are preferably constituted by metallized mirrors.

The signals coming from the detectors 215 to 218 are processed and applied to the respective corresponding radial bearing servo-control loops in order to modify the reference voltages which determine the position of the axis of the spindle 50 relative to the stators of the magnetic bearings 11 and 12.

Figure 14:
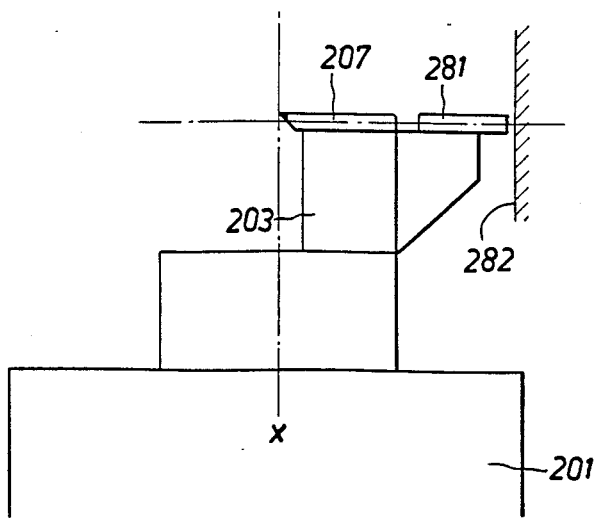
FIG. 14 is a diagrammatic view in the plane of FIG. 9 showing a tool-supporting portion of the machine tool.

Turning now to the tool 207 placed on its slide 201, in order to guarantee that the tip of the tool 207 remains in a plane perpendicular to the axis of the spindle 1 when the slide 201 is activated, it is necessary to provide a detector 281 in the vertical axial plane of the tool 207. This detector 281 is fixed to the slide 201 and measures proximity variations with a reference plane surface 282 which has previously been placed perpendicularly to the axis of the spindle 50 (FIGS. 8, 9, and 14). The detector 281 is preferably of the capacitive type and co-operates with a plane mirror 282 mounted in a fixed support 280.

The signal from the detector 281 is processed and then applied to the servo-control loop of the axial magnetic bearing 14 in order to modify its reference voltage which defines the axial position of the spindle 50 relative to the spindle assembly stator.

FIGS. 15 and 16 show an embodiment of the invention in which the magnetic suspension of the spindle 50 is used not only to correct for defects in the spindle carrier slide 202, but also for roll, yaw, pitch, and rectitude of the tool-carrier slide 201. This is done by placing two capacitive type detectors 281 and 283 which are spaced apart from each other in a plane $P_1$ (FIG. 16) passing through the tool 207 and parallel to the base plane of the slide 201, and two capacitive type detectors 285 and 286 which are situated in a plane $P_2$ (see FIG. 15) perpendicular to the plane $P_1$. The detectors 285 and 286 are themselves situated in planes perpendicular to the planes $P_1$ and $P_2$ and containing the detectors 281 and 283 respectively.

The four detectors 281, 283, 285, and 286 fixed to the slide 201 measure proximity variations relative to two plane reference surfaces 282 and 284 which are mutually perpendicular and fixed to the fixed support 206. Both of the plane surfaces 282 co-operating with detectors 281, 283, and 284 co-operating with the detectors 285, 286 are constituted by metallized plane mirrors.

The signals delivered by the detectors 281, 283, 285, and 286 serve to determine defects in the slide 201 and, by acting on the reference voltages of the servo-control loops of the radial bearings 11 and 12 of the workpiece-carrier assembly 205, they serve to compensate said defects in real time by selectively modifying the position of the spindle 50 in the spindle assembly. Since the detectors 281 & 285 and 283 & 286 are situated in planes which are different from those of the radial bearings 11 and 12, unlike the detectors 215 & 217 and 216 & 218 which are used for compensating defects in the spindle carrier slide 202, it is naturally necessary to make use of a computer for performing conversion operations in order to generate the appropriate compensation signals in the planes of the radial bearings 11 and 12 in order to cancel the error signals generated by the detectors 281, 283, 285, and 286. In general, the signals delivered by the detectors 281, 283, 285, and 286 are processed in pairs in order to determine the proportion of each defect which is due to translation and the proportion which is due to rotation. The modified reference voltages applied to the servo-control loops of the radial bearings and of the axial bearings are intended to maintain the axis of the tool 207 perpendicular to the tangent plane at the point under consideration of the surface to be machined.

In FIG. 9, references 230 and 231 respectively designate the D.C. electric motor for rotating the turntable 203 and a tachometer generator. An angle encoder is also associated with the turntable 203.

Figure 10:
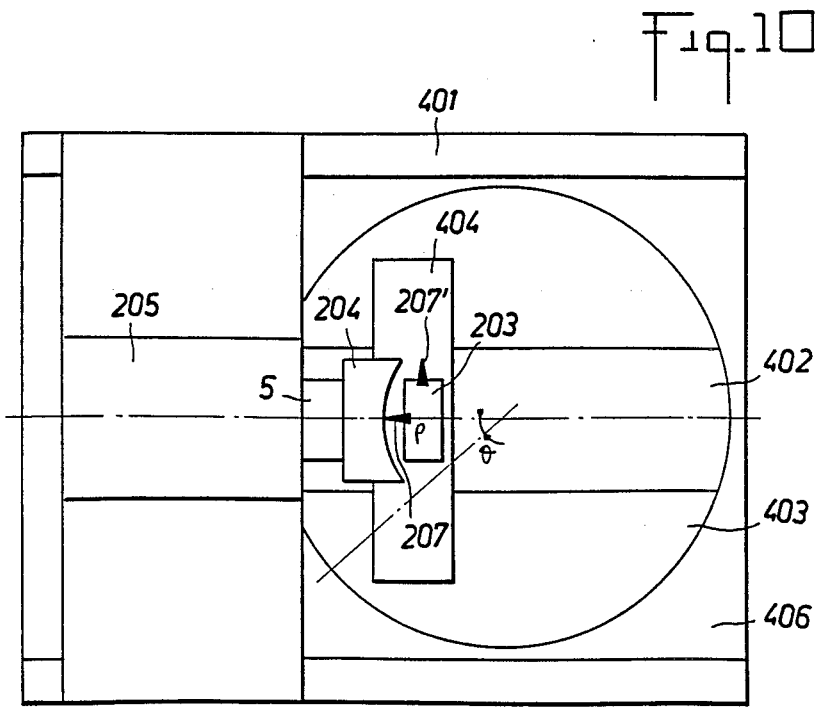
FIG. 10 is a diagrammatic plan view of a machine tool using a polar co-ordinate axis system.

FIG. 10 is a symbolic representation of a polar type machine tool for machining complex surfaces, and it comprises a horizontal axis spindle assembly 205 which may be the same as the above-described spindle assembly 1, placed on a slide 401 extending over a vertical axis turntable 403 having a slide 402 for a tool 203 disposed thereon. The supporting block 406, e.g. made of granite, is isolated from the ground by means of a pneumatic suspension. FIG. 10 also shows a zeroing slide 404. The workpiece 204 is placed on the workpiece carrier disk 5 of the spindle assembly 205 as for the embodiment shown in FIGS. 7 to 9.

If the displacements of the spindle 50 of the spindle assembly 205 within its magnetic bearings are programmed as a function of the rotation of the turntable 403, it is possible to obtain a surface on the workpiece 204 having special shapes.

In particular, if a periodically varying reference voltage is applied to the servo-control loop of the axial bearing 14, the spindle is displaced back-and-forth along its axis. The surface generated by displacing the workpiece 204 while the tool slide 201 is activated, depends on the parameters used.

Thus, remembering that the machining frequency is the reciprocal of the time taken by the tool to travel along the radius of the workpiece, if the reference voltage frequency is less than the machining frequency, then the resulting surfaces are convex or concave.

If the frequency of the reference voltage is less than the frequency of rotation of the spindle but greater than the machining frequency, then spirals of controllable amplitude are obtained suitable for use as roughness standards.

If the frequency of the reference voltage is equal to or greater than the frequency rotation of the spindle, then radial fluting is obtained.

Similarly, in order to cause the axis of the spindle 50 to intersect the axis of the turntable 403, after conventional preadjustment, it is possible to perform fine adjustment by acting on the reference voltages used in the radial servo loops of the radial bearings 11 and 12.

Similarly, in order to place the tip of the tool 207 at the same height as the spindle axis (both in cartesian co-ordinate machining and in polar co-ordinate machining) it is advantageous to make use of the servo-control loops of the radial magnetic bearings 11 and 12 of the spindle.

As shown in FIG. 10, the tool 207 may be placed perpendicularly to the surface to be machined in a frontal position, or else it may be placed in a lateral position 207'.

A polar co-ordinate type machine has an overall structure which is simpler than the structure of a cartesian type machine, and it is not necessary to use an interferometer measuring device as in the embodiment of FIGS. 7 to 9. This is because it is necessary to verify rotation only during machining since all of the other parameters depend on initial adjustments. The tachometer generator and an angle encoder associated with the turntable 403 thus provide all of the sensing required for machining operations.

FIG. 17 shows a means of correcting eccentricity defects in the turntable 403. The spherical surface 480 formed on a part 408 is centered on the axis 232 of the turntable 403 and is fixed on a fixed support. A position sensor 407 is placed on the axis of the tool 207 and measures proximity variations relative to the spherical surface 480. The signal from the sensor 407 is processed and is then sent to the servo-control loop for the axial bearing 14 of the spindle 50 carrying the workpiece to be machined 204.

It may be observed that the device for correcting excentricity defects in a turntable is also applicable to a machine of the cartesian type, as shown in FIG. 18. In this case, in order to correct excentricity in the turntable 203, a reference spherical surface 380 is used which is exactly centered on the axis of the turntable and which is carried by a support 308 which is fixed to the moving plate of the slide 201. The sensor 507 measures proximity variations relative to the spherical reference surface 380 and is placed on the axis of the tool 207, and the signal from the sensor 507 is processed and is then used to selectively modify the reference voltage of the servo-control loop for the axial bearing 14 of the spindle 50 carrying the workpiece to be machines 204.

I claim:

1. A workpiece-carrier spindle assembly having active magnetic bearings for a very high precision machine tool, the assembly comprising a stator mounted on a slide for guidance along a predetermined direction, a spindle mounted inside the stator, a chuck fixed to the spindle, first and second radial active bearings supporting the spindle and controlled from radial detectors for detecting the position of the rotor, an axial abutment constituted by an axial active magnetic bearing co-operating with a disk fixed to the spindle and controlled from at least one axial detector for detecting the position of the spindle, and an electric motor for rotating the spindle, wherein:

the electric motor is external to the spindle assembly stator, is disposed behind the spindle and substantially in alignment therewith, the external motor has a smaller air gap than the air gap between the radial magnetic bearings and the spindle, the rotary drive communicated to the spindle by the external motor expressed in revolutions per second (Hz) lies outside the servo-control passband of the magnetic suspension system expressed in hertz, a flexible coupling device connects the outlet shaft of the external motor to the rear portion of the spindle while filtering mechanical disturbances due to the eccentricity of the motor, and the spindle assembly further includes additional means for detecting movements of the spindle assembly guide slide and means for selectively modifying the electrical reference voltages of the servo-control loops of the axial bearing and of the radial bearings as a function of the signals from said additional detection means, said additional means for detecting movements of the slide on which the workpiece-carrier spindle assembly is placed including two detectors in the servo-control plane of each of the radial bearings, said detectors being fixed to the spindle assembly stator and facing two plane reference surfaces disposed parallel to the displacement direction of said slide, said detectors delivering electrical signals proportional to variations in the distances between said detectors and said plane reference surfaces in order to control in real time the means for selectively modifying the reference voltages of the servo-control loops of the radial bearings of the workpiece-carrier spindle assembly as a function of said proximity variations between the detectors and the plane reference surfaces.

2. A workpiece-carrier spindle assembly according to claim 1, wherein the natural frequency of the magnetic suspension system is about 50 Hz to 80 Hz, whereas the speed of rotation of the spindle lies between about 25 Hz and 40 Hz.

3. A workpiece-carrier spindle assembly according to claim 1, wherein the external motor has an air gap of about 0.1 mm, whereas the air gap between the radial magnetic bearings and the spindle is about 3 mm.

4. A workpiece-carrier spindle assembly according to claim 1, including first and second axially spaced-apart radial detectors situated on either side of said second radial magnetic bearing disposed in the vicinity of the workpiece-carrier chuck, wherein the second radial detector is removably mounted between said second radial magnetic bearing and the workpiece-carrier chuck, and wherein during an initial setting up stage, the second radial magnetic bearing is controlled by the first radial detector in order to perform an operation on the spindle of rectifying the reference track of the second radial detector, and that during subsequent stages of machining workpieces supported by the workpiece-carrier chuck, the second radial magnetic bearing is controlled by the second radial detector co-operating with said reference track.

5. A workpiece-carrier spindle assembly according to claim 1, including first and second axial detectors, with the first axial detector being disposed at the rear of the spindle assembly and serving to control an axial abutment during an operation of rectifying a reference track on a front face formed at the front of the spindle assembly, with the second axial detector which co-operates with said reference track serving to control the axial abutment during a subsequent stage of machining a workpiece.

6. A workpiece-carrier spindle assembly according to claim 1, wherein the chuck fixed to the sensor is a suction plate provided with suction orifices distributed over its front face, and wherein the suction device associated with the suction plate comprises a vacuum pump, a buffer suction chamber, disposed behind the electric motor and connected to the vacuum pump, and a suction duct beginning inside the buffer chamber extending axially inside the shaft of the motor, inside the coupling device, and inside the spindle in order to open out into a cavity formed in the workpiece-carrier chuck, which cavity is in communication with the suction orifices.

7. A workpiece-carrier spindle assembly according to claim 1, wherein the coupling device comprises an airtight tubular sleeve made of a material such as rubber or an elastomer.

8. A workpiece-carrier spindle assembly according to claim 1, including a magnetic type of chuck, and wherein the axial detector for detecting the position of the spindle and situated in the vicinity of the chuck is of the capacitive type.

9. A device for correcting eccentricity defects in the turntable of a machine tool used with polar co-ordinates, the machine tool including a first adjustment slide extending over a vertical axis turntable on which a second adjustment slide is placed for supporting a tool, and a workpiece-carrier spindle assembly placed on said first adjustment slide, said device comprising a workpiece-carrier spindle assembly according to claim 1, and further comprising a spherical reference surface centered on the axis of the turntable and placed on a fixed support fixed to the base carrying the machine tool, a proximity sensor placed on the axis of the tool, means for detecting proximity variations between the sensor and the spherical reference surface, and means for modifying in real time the reference voltage of the servo-control loop of the axial bearing of the workpiece-carrier spindle assembly as a function of said proximity variations between the sensor and the spherical reference surface.

10. A device for correcting defects in the movements of the slides in a machine tool used in a cartesian frame of reference and including first and second slides whose displacement axes are oriented along two perpendicular directions XX' and YY', a turntable placed on the first slide, a workpiece-carrier spindle assembly placed on the second slide, and devices for measuring the displacements of the first and second slides, said device for correcting defects in the movements of the slides comprising:

a workpiece-carrier spindle assembly according to claim 1, additional means for detecting the movements of the first slide for guiding the turntable, said additional means for detecting the movements of the first slide on which the turntable is placed comprising a moving detector placed in a vertical plane containing the axis of the tool and fixed to the first slide, a plane reference surface placed perpendicularly to the axis of the workpiece-carrier spindle assembly, and means for detecting variations in the space between the detector and the plane reference surface, with the means for selectively modifying in real time the electrical reference voltage of the servo-control loop of the axial bearing being controlled as a function of said proximity variations between said moving detector fixed to the first slide and said plane reference surface.

11. A device according to claim 10, wherein said additional means for detecting movements of the second slide on which the workpiece-carrier spindle assembly is placed includes two detectors in the servo-control plane of each of the radial bearings and fixed to the spindle assembly stator, each of said detectors facing a plane reference surface disposed parallel to the displacement direction of the second slide and perpendicular to the other plane reference surface placed facing the other detector disposed in the same servo-control plane of a given radial bearing.

12. A device according to claim 10, wherein said additional means for detecting the movements of the first slide on which the turntable is placed include a first group of two detectors which are spaced apart from each other in a plane P1 passing through the tool and parallel to the base plane of the first slide, and a second group of two detectors situated in a plane P2 perpendicular to said plane P1, the first detectors and the second detectors of the first and second groups of detectors being disposed in planes P3 and P4 perpendicular to said planes P1 and P2 and to the base plane of the first slide; and first and second plane reference surfaces fixed perpendicularly to each other and to the axis of the workpiece-carrier spindle assembly; processor means for processing the signals coming from the first and second groups of two detectors and representing variations in the gaps between each detector and the plane reference surface which it faces; and means for selectively modifying in real time the electrical reference voltages of the servo-control loops of the radial bearings and of the axial bearing which are controlled as a function of the signals delivered by said processor means.

13. A device according to claim 10, further including a spherical reference surface centered on the axis of the turntable and carried by a support fixed to said first slide, a proximity sensor placed on the axis of the tool, means for detecting proximity variations between the sensor and the spherical reference surface, and means for modifying in real time the reference voltage of the servo-control loop of the axial bearing of the workpiece-carrier spindle assembly as a function of said proximity variations between the sensor and the spherical reference surface.

14. A device according to claim 1, 10 or 9, wherein the plane or spherical reference surfaces are constituted by metallized mirrors and the proximity sensors are of the capacitive type.

* * * * *